United States Patent [19]

Saito et al.

[11] 4,027,163

[45] May 31, 1977

[54] METHOD OF COMPENSATING FOR QUENCHING EFFECT OF SUBSTANCE CONTAINED IN A SAMPLE GAS THE RADIOACTIVITY OF WHICH IS TO BE MEASURED BY A RADIOACTIVITY DETECTOR AND APPARATUS FOR PERFORMING THE SAME

[75] Inventors: Tomo Saito, Sagamihara; Kazuo Watanabe, Yokohama; Naotake Morikawa, Tokyo, all of Japan

[73] Assignee: Sagami Chemical Research Center, Tokyo, Japan

[22] Filed: Jan. 15, 1975

[21] Appl. No.: 541,250

[30] Foreign Application Priority Data

Jan. 25, 1974 Japan .............................. 49-10114

[52] U.S. Cl. ............................ 250/363 R; 250/369; 250/252
[51] Int. Cl.² .................... G01T 1/20; G01D 18/00
[58] Field of Search .......... 250/252, 328, 361, 362, 250/363, 364, 369, 379, 380, 383, 384

[56] References Cited

UNITED STATES PATENTS

| | | | |
|---|---|---|---|
| 2,873,377 | 2/1959 | McKay | 250/380 |
| 3,138,713 | 6/1964 | Fowler | 250/363 |
| 3,381,130 | 4/1968 | Nather | 250/363 |
| 3,538,327 | 11/1970 | Robinson, Jr. | 250/380 |
| 3,657,532 | 4/1972 | Zimmerman | 250/369 |
| 3,688,120 | 8/1972 | Packard | 250/363 |
| 3,721,824 | 3/1973 | Bristol | 250/369 |
| 3,725,657 | 4/1973 | Laney | 250/362 |

FOREIGN PATENTS OR APPLICATIONS 199,279 12/1967 U.S.S.R. .............................. 250/364

Primary Examiner—Alfred E. Smith
Assistant Examiner—David K. Moore
Attorney, Agent, or Firm—Oblon, Fisher, Spivak, McClelland & Maier

[57] ABSTRACT

A first and a second radioactivity detectors are used in series or in parallel which have substantially the same constructive features and the second radioactivity detector includes a fixed standard radioactive source therein. Sample gases each having a common radioactivity and having a different quenching effect are passed through the two radioactivity detectors sequentially to measure the effective radioactivities thereof to thereby obtain counting efficiencies of the two radioactivity detectors. A correction curve is drawn by putting the counting efficiency of the first radioactive detector along one axis of an orthogonal coordinates and the counting efficiency of the second radioactivity detector along the other axis of the coordinates. An unknown sample is treated in the same manner as the above to obtain the counting efficiency of the second detector for the unknown sample and a corresponding counting efficiency of the first radioactivity detector is obtained from the correction curve by the last counting efficiency of the second radioactivity detector. The quenching effect of the unknown sample is compensated for by using the corresponding counting efficiency of the first radioactivity detector.

5 Claims, 10 Drawing Figures

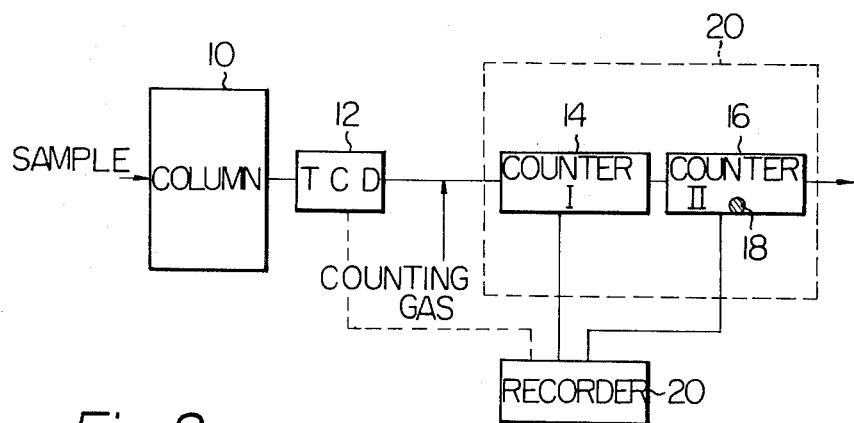
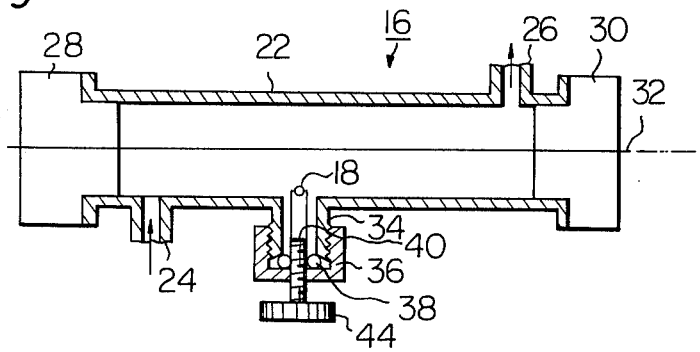
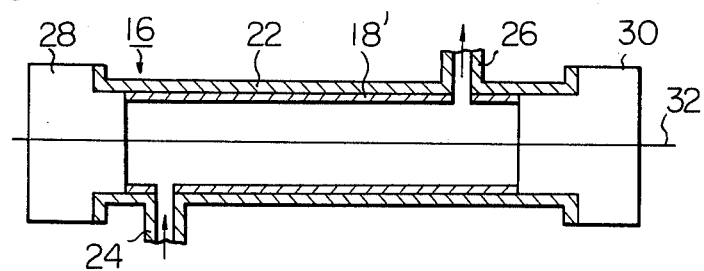

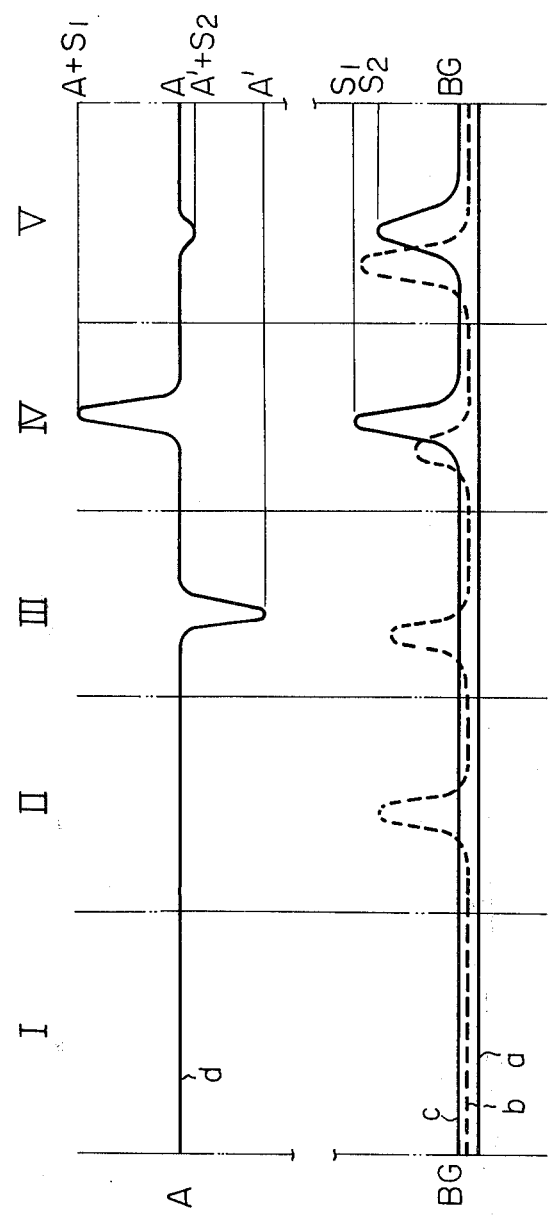

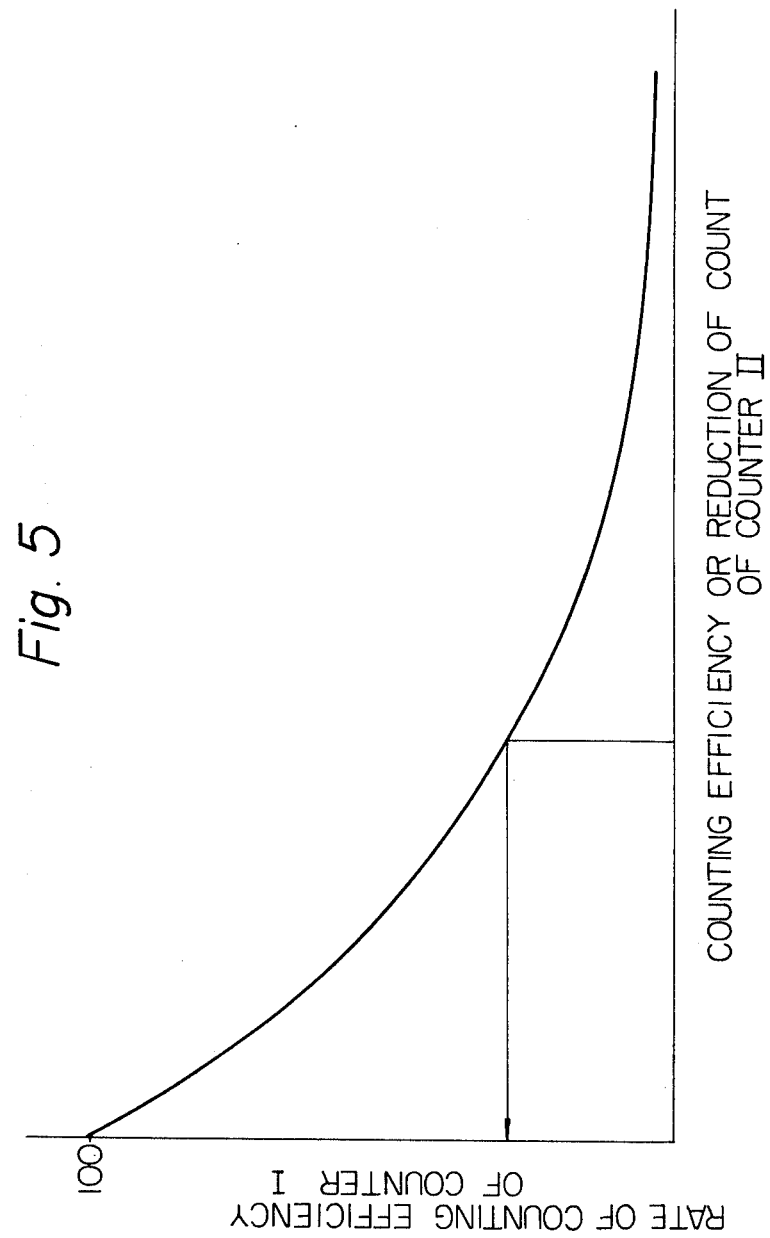

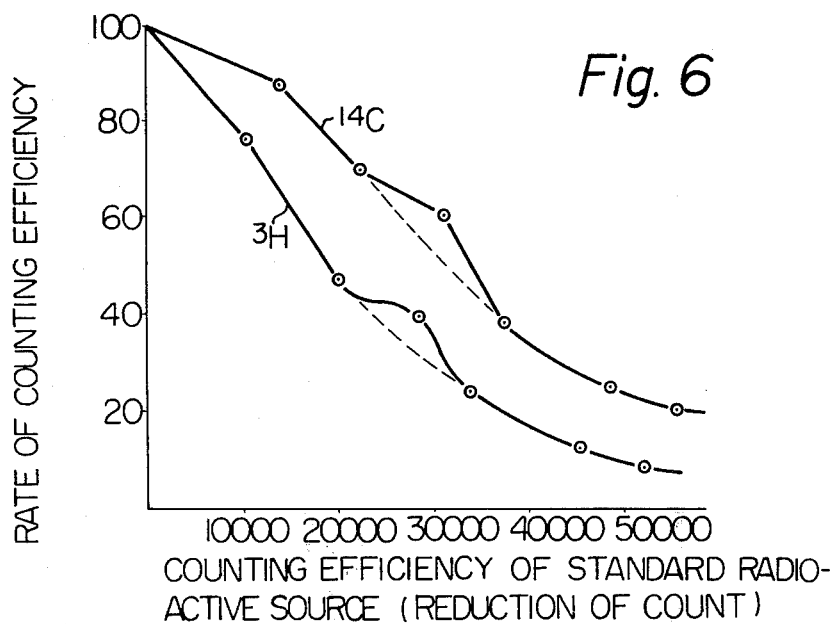
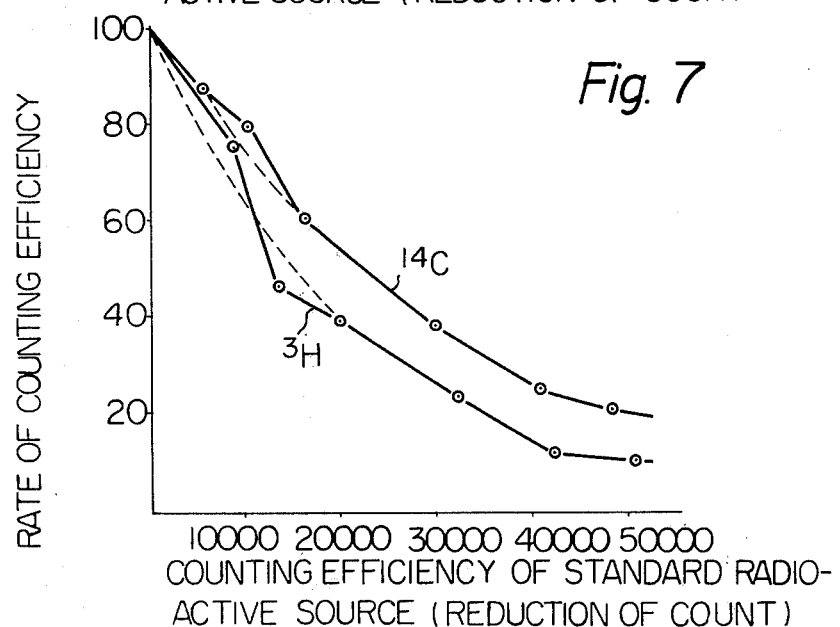

METHOD OF COMPENSATING FOR QUENCHING EFFECT OF SUBSTANCE CONTAINED IN A SAMPLE GAS THE RADIOACTIVITY OF WHICH IS TO BE MEASURED BY A RADIOACTIVITY DETECTOR AND APPARATUS FOR PERFORMING THE SAME

BACKGROUND OF THE INVENTION

The present invention relates to, in general, the gas counting method and, in particular, to a compensation for variations in counting efficiency due to the quenching effect provided by substances included in a sample gas, the radioactivity of which is to be measured.

In case where a radioactivity of a gaseous sample containing substance or substances providing quenching effect is to be measured, it is known that the counting efficiency is lowered by the quenching effect, resulting in that a precise measurement of the radioactivity of the sample becomes impossible. It has been known that the gas counting method can be classified generally to the batch system and the flow system. In the batch system, the correction for the quenching effect is usually performed by sufficiently refining the sample gas, measuring the radioactivity thereof, preparing the same amount of a standard gas having the same chemical structure as those of the sample gas, measuring the radioactivity thereof and comparing the measured results. On the other hand, in the conventional flow system, the problem due to the quenching effect is resolved by selecting chemical structure of the sample as compound or compounds providing no quenching effect so that any component which would otherwise provide the variation of counting efficiency could be removed as complete as possible.

In any case, the conventional system employs as the main part thereof a pretreatment of the sample gas to avoid the quenching effect which is absolutely necessary to be removed. However, as well known, the pretreatment of the sample gas is not only relatively difficult but also requires a time consuming works and corresponding expenses. In addition to these disadvantages, there is a possibility of mixing in of an uncertainty, making the pretreatment undesirable.

SUMMARY OF THE INVENTION

The present invention has an intention of overcoming the previously mentioned disadvantages inherent to the conventional gas counting method by providing a novel method of correcting the variation of the counting efficiency due to the quenching effect in gas counting method and a novel apparatus for performing the same method.

Other objects and features of the present invention will become apparent by reading the following description of an embodiment of the present invention with reference to the attached drawings.

BRIEF DESCRIPTION OF THE DRAWING

FIG. 1 is a schematic block diagram, showing an example of apparatus for performing the present method;

FIG. 2a is a cross sectional view of an example of counting tubes constructed in accordance with the present invention which is effectively used in performing the present method;

FIG. 2b is a cross sectional view of another example of the counting tubes constructed in accordance with the present invention;

FIG. 3 is an explanatory graph illustrating the principle of the present invention;

FIG. 5 shows a typical correction curve obtainable according to the present invention; and FIGS. 6 through 9 are correction curves obtained by the present invention.

DESCRIPTION OF PREFERRED EMBODIMENT

Figure 4:
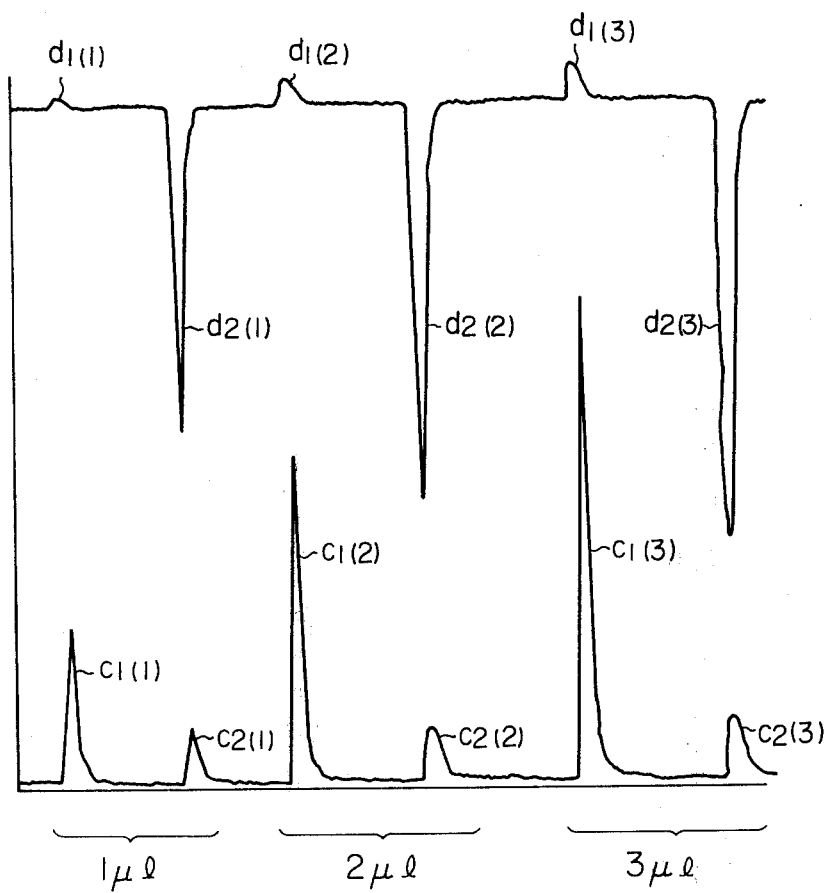
FIG. 4 is a graph showing an example of experimental data corresponding to the graph in FIG. 3.

Returning to FIG. 1, there is shown schematically an apparatus according to the present invention when applied in a radiogaschromatography. A sample gas enters into a column 10 of the radiogaschromatography apparatus wherein the constituents of the gas are separated. The separated constituents of the gas enter into a thermal conductivity detector 12 connected to the outlet of the gas column 10, wherein amounts of the respective constituents are measured in the conventional manner. In the prior art radiogaschromatography apparatus, the constituents flowing out from the thermal conductivity detector 12 are conducted into a counting tube wherein the radioactivity thereof are detected. On the contrary, in the present method, the constituents from the thermal conductivity detector 12 are conducted into a counting device 20 constructed in accordance with the present invention.

The counting device 20 comprises a counting tube 14 and another counting tube 16 connected in series with the first counting tube 14. The counting tube 14 may be of any of the conventional types. The counting tube 16, however, houses a standard radioactive source 18 having a fixed, known radioactivity.

Examples of the construction of the counting tube 16 are shown in FIGS. 2a and 2b respectively.

In FIG. 2a, the counting tube 16 comprises a generally cylindrical cathode tube portion 22, end pieces 28 and 30 of such as Teflon which close the opposite ends of the cathode tube portion 22, an anode wire 32 centrally stretched in and along the cathode tube portion 22 throughout the length thereof and supported by the end pieces 28 and 30, a gas inlet port 24 adjacent one of the opposite ends of the cathode tube portion 22 and a gas outlet port 26 provided adjacent the other end of the tube 22. The construction mentioned above is common to the construction of the counting tube 14 which may be one of the conventional counter tubes.

As to the special construction of the counter tube 16, the cathode tube portion 22 is provided with an opening 34 at substantially center position along the length thereof. The opening 34 is air-tightly sealed by a threaded cap 36 through an O-ring 38 as illustrated. The cap 36 has a central threaded hole through which a rod 40 is inserted and fixedly positioned by a thread engagement with the thread provided on the inner wall of the hole. On the top of the rod 40, the standard radioactive source 18 is suitably provided so that when the rod 40 is inserted and fixedly positioned, the standard radioactive source 18 is located within the interior of the cathode tube 22. The position of the standard radioactive source 18 within the cathode tube 22 is regulatable by an adjustment of a head portion 44 provided on the outer end of the rod 40.

In the example of the counter tube 16 shown in FIG. 2b, a fixed standard radioactive source takes in the form of coating deposited on the inner surface of the cathode tube 22 as shown by 18'. Other constructive features of the example in FIG. 2b than this standard radioactive source are the same as those of the counter shown in FIG. 2a.

In any of the present counter tube 16, the sample gas passed together with a counting gas such as propane gas through the counter tube 14 is conducted into the sample inlet port 24 of the counter tube 16, passed through the cathode tube 22 and discharged from the sample outlet port 26. Therefore, the sample gas is measured in its radioactivity twice by the counter tube 14 and the counter tube 16.

As mentioned before, the only difference between the counter tubes 14 and 16 is that the latter counter tube houses a fixed standard radioactive source 18 or 18' such as $^3H$, $^{14}C$, $^{63}Ni$, $^{137}Cs$, $^{60}Co$, $^{90}Si$ or $^{238}U$, etc.

Now, the present method using the specially constructed counter device 20 will be described with reference to FIG. 3. FIG. 3 illustrates five particular situations which might arise using the Applicant's radiation detection device.

Assuming firstly a condition in which a sample gas is absent, the output of the thermal conductivity detector 12 shows a base line as shown by a dotted line $b$ and the output of the counter tube 14 also shows only a background or a natural counting as shown by a solid line $c$. However, the output of the counter tube 16 shows a constant counting rate as shown by a solid line $d$, the magnitude of which is known and depends upon the intensity of the fixed radioactive source 18 housed therein. The constant counting rate during a period I under this condition is represented as $A$ (counts/minute).

Then, in a period II under a condition in which a sample gas having no quenching effect and no radioactivity is flown through the apparatus, although the thermal conductivity detector 12 detects a peak showing the amount of the sample gas constituent, the outputs of the counter tubes 14 and 16 remain in the same states as those shown in the period I.

In a case where the sample gas contains substances such as halogen, nitrogen or sulfur which has an electron capturing property and thus has the quenching effect but no radioactivity, the thermal conductivity detector 12 detects a peak whose magnitude depends upon the amount of the sample and the output of the counter tube 14 remains as unchanged. However, the counting rate of the counter tube 16 with respect to the radioactivity of the fixed source 18 is lowered due to the quenching effect of the sample. This condition is shown in a period III and the lowered counting rate of the counter tube 16 is represented by $A'$ (counts/minute).

In another case where the sample has a radioactivity but no quenching effect, the thermal conductivity detector 12 detects a peak according to the amount thereof and the counter tube 14 also detects a peak according to the radioactivity thereof. The value of the peak count is assumed as $S_1$ (counts/minute). In this case, the counter tube 16 provides $(A+S_1)$ counts/minute where $A$ is the counting rate due to the standard radioactive source 18. This state is shown in a period IV.

Finally, where the sample has the quenching effect as well as radioactivity, the thermal conductivity detector 12 detects a peak according to the amount thereof and the counter tube 14 provides a counting rate $S_2$ (counts/minute) which represents the counting rate of the counter tube 14 when radioactivity and quenching exist in the sample. The counting rate $S_2$ is lower than $S_1$ where there is no quenching effect for the same sample. On the other hand, the counter tube 16 provides a counting rate $(A'+S_2)$ because the counting rate thereof for the standard radioactive source 18 is lowered to $A'$ counts/minute due to the quenching effect of the sample when no radioactivity exists in the sample. This condition is shown in a period V.

The counting rate $A$, that is, the intensity of the radioactivity of the standard radioactive source 18 in the counter tube 16 can be determined under the conditions I and II.

The counting efficiency of the counter tube 14 can be immediately determined as $(S_2/S_0 \times 100)\%$ where, under the condition V, the counting rate of the counter tube 14 becomes $S_2$ when a sample having known radioactivity $S_1=S_0$ as well as the quenching effect is measured by the counter tubes 14 and 16. Since in this case, the measured value of the counter tube 16 is $(A'+S_2)$ as mentioned above, the counting efficiency or the reduction of the count due to the quenching of the standard radioactive source can be immediately determined as $$\frac{(A' + S_2) - S_2}{A} \times 100\%.$$

In this manner, by performing the above mentioned determinations for each of various samples having various quenching effects, the variation of the counting rate or the variation of the count of the standard radioactive source 18 can be measured in correspondence to the variation of the counting rate of the samples, i.e., the magnitude of the quenching effect of the samples. And, with the counting efficiency of the sample plotted on one axis of orthogonal coordinates and with the count of the standard radioactive source plotted on the other axis, a correction curve for each sample can be obtained.

FIG. 4 shows an example of the condition V shown in FIG. 3. In FIG. 4, peaks $C_1$ and $C_2$ on the counting curve $C$ of the counter tube 14 were examples for (i) sample containing $^{14}C$-methanol (50μl) and methanol (50μl) and (ii) sample containing $^{14}C$-methanol (50μl) and a mixture (50μl) of methanol and a very small amount of chroloform. That is, the sample (i) is a sample having no quenching effect and the sample (ii) includes a variable amount of chroloform which provides a quenching effect. It is noted that in this Figure the calibrations on the chart for the counter tubes 14 and 16 are not common for convenience.

In FIG. 4, when 1μl of the sample (i) is used, the count of the counter tube 14 becomes $C_{1(1)}$ as shown and the output of the counter tube 16 provides a peak $d_{1(1)}$ which is a summation of the count due to the standard source and the count $C_{1(1)}$. Then, when 1μl of the sample (ii) including 2% (by weight) $CHCl_3$ is flown through the apparatus, the output of the counter tube 14 becomes $C_{2(1)}$ which is smaller than $C_{1(1)}$ due to the quenching effect of $CHCl_3$ and the output of the counter tube 16 provides a peak $d_{2(1)}$. These two tests are repeated for 2μl and 3μl of the samples (i) and (ii) respectively, the peaks obtained being as shown in FIG. 4. These tests are further performed by changing the counting rate or the reduction of count of the counter tube 16 for the standard source therein by using samples each having known radioactivity So and having various amount of quencher. The counts obtained by the counter tube 16 are subtracted by the counts obtained by the counter tube 14 in each of the above tests and the results are divided by the counts of the standard source to obtain the counting efficiency or the percentage reduction of count.

By plotting the counting efficiency or the percentage reduction of count thus obtained on the abscissa and the counting efficiency calculated from the So and the measured value by the counter tube 14 (for example, $S_2$) on the ordinate to obtain a correction curve such as shown in FIG. 5.

Typical examples of the correction curves are shown in FIGS. 6 to 9.

FIG. 6 shows the correction curves obtained when propane gas is used as a carrier gas, a mixtures of $^{14}C$-methanol and chroloform as a quencher and a mixture of $^3H$-methanol and chroloform as a quencher, the amount of chroloform being from 0 to 1% are used as the samples, the upper curve being that for the mixture of $^{14}C$-methanol and chroloform and the lower curve being that for $^3H$-methanol and chroloform.

Figure 8:
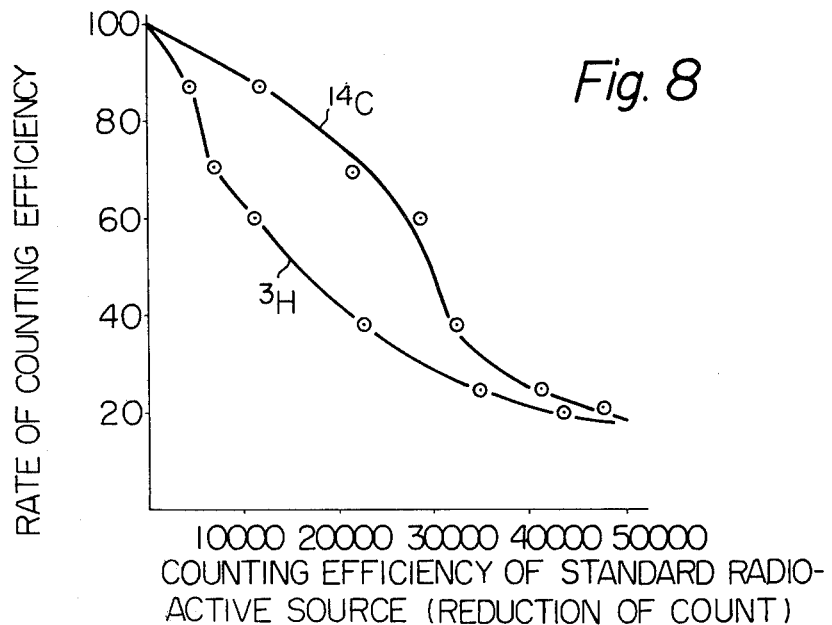
Figure 9:
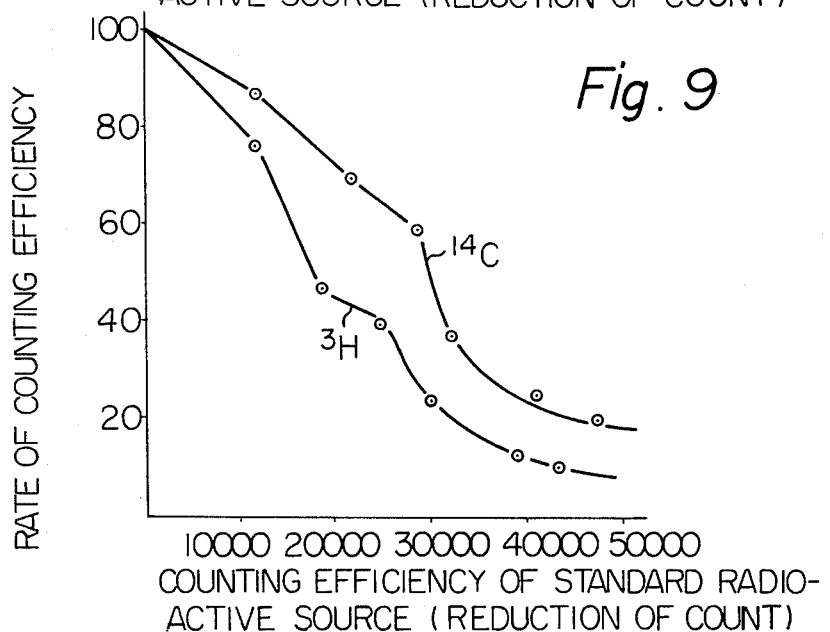

FIG. 7 is similar to FIG. 6 except that the measuring conditions of the output pulses due to the standard radioactive source are different from each other. In FIGS. 8 and 9, the standard source is $^{14}C$ which was also used as the standard source in the examples shown in FIGS. 6 and 7. However, the measuring conditions are not common.

FIG. 8 is a result when $^{14}C$-methanol is used as the sample gas and a various amount of chroloform is used as the quencher in a range of 0 to 1% by weight, and shows a variation of the correction curve due to the variation of the measuring condition of the output pulses from the standard radioactive source.

FIG. 9 shows other examples obtained for samples similar to those used in FIGS. 6 and 7.

With the correction curves obtained in this manner, when an unknown sample is measured by the counter tubes 14 and 16 and the results therefrom show the count $S_2$ and $A'+S_2$ respectively, the counting rate $S_1$ for this sample may be immediately determined by calculating $(A'+S_2)-S_2$ and then $(_4{}^{A'}\times 100)$ and by putting the result on the abscissa. The ordinate $S_2/S_1$ can be derived by looking at the curve. Because the value of $S_2$ is known, $S_1$ can be calculated from the ratio $S_2/S_1$ which represents the ordinate value.

The foregoing describes the correction in flow system taking radiogaschromatography as an example. It has been found, however, that the counter tubes 14 and 16 should be designed to have small internal volumes respectively so that the variation of concentration of the sample during its pass through the counting tubes 14 and 16 is limited in a very small range. This is because the difference in concentration of the sample in the counter tubes becomes negligible. However, even if there is any variation of sample concentration, only effect of this on the correction curves obtained by the present invention is a corresponding variation of the slope of curve and it is still possible to perform the correction for the quenching effect. Further it will be clear for those skilled in the art that a correction which is similar to that in the flow system but easier and more precise than that in the flow system is possible in the batch system.

It is possible to apply the present invention to a correction for quenching effect in the flow-cell used in the liquid syntillation counting method. In the latter case, it may be sufficient to add a syntillation detector having its own standard radioactive source to the syntillation detector presently used in this method. The design of the syntillation detector to be added should, of course, be the same as that of the originally existing scintillation detector except that the standard radioactive source is provided in the added detector, as in the case of the described embodiment.

Furthermore, when $\alpha$ radiation source is used as the standard radioactive source to be housed in the second counter tube, another advantage will be obtained which is as follows: Since, when $\alpha$ radiation is measured by a proportional counter tube, an output pulse which is large enough to make it possible to be measured is obtained at a voltage lower than that required for $\beta$ or $\alpha$ radiation because of relatively large ionization capability of $\alpha$ray and therefore the aforementioned S in the term (A-S) becomes negligible provided that the radioactivity of the sample is other than $\alpha$ radiation.

The use of a soft $\beta$ source such as $^3H$ or $^{63}Ni$ etc. as the standard source will be particularly convenient in precisely compensating for a light or small quenching effect because of very weak energy of such radiation ray. Further, the use of $\alpha$ ray such as $^{137}Cs$ etc. is particularly convenient in preparation of the measurement such as the provision or removal of the ray source.

Although in the above described examples, the reduction of efficiency is represented by counts, it may be also possible to represent it as a channel ratio of spectral deviation.

What is claimed is:

1. A method of correcting for the quenching effect of a substance contained in a sample gas, the radioactivity of which is to be measured by a radioactivity detector, comprising the steps of:

measuring the radioactivities of samples each having a known radioactivity and each having a different quenching effect by a first radioactivity detector;

obtaining counting efficiencies of the first radioactivity detector for the various quenching effects on the basis of the measured radioactivities;

plotting the counting efficiencies of the first radioactivity detector along one axis of orthogonal coordinates;

measuring the radioactivities of the same samples by a second radioactivity detector having a fixed known standard radioactive source therein;

obtaining counting efficiencies of the second radioactivity detector by subtracting the measured radioactivities of the first radioactivity detector from the measured radioactivities of the second radioactivity detector respectively and by dividing the result of the subtractions by the radioactivity of the standard radioactive source housed in the second radioactivity detector;

plotting the counting efficiencies of the second radioactivity detector along the other axis of the orthogonal coordinates and plotting a correction curve on the basis of the two sets of counting efficiencies;

repeating the preceeding steps for an unknown sample to obtain a counting efficiency of the second radioactivity detector for the unknown sample; and obtaining a counting efficiency of the first radioactivity detector for the unknown sample corresponding to the counting efficiency of the second radioactivity detector from the correction curve to correct for the variation of counting efficiency of the first radio activity detector due to the quenching effect of the unknown sample.

2. An apparatus for determining the radioactivity of an unknown sample comprising:

column means for separating the constituents of the unknown sample;

a thermal conductivity detector connected to said column means for measuring the amounts of the constituents of the unknown sample;

a first radioactivity detector connected to said thermal conductivity detector;

a second radioactivity detector, said second radioactivity detector being substantially similar to said first radioactivity detector and being connected to said first radioactivity detector, said second radioactivity detector including a fixed standard radioactive source therein; and recording means for recording the radioactivity detected by said first and second radioactivity detectors.

3. An apparatus as set forth in claim 2, wherein said first and second radioactivity detectors are proportional counter tubes and said fixed standard radioactive source is detachably inserted into said second proportional counter tube from the outside of said second tube.

4. An apparatus as set forth in claim 2, wherein said first and second radioactivity detectors are proportional counter tubes and said fixed standard radioactivity source is in the form of coating deposited on an inner wall of said second counter tube.

5. An apparatus as set forth in claim 2, wherein said first and second radioactivity detectors are scintillation detectors.

* * * * *